United States Patent [19]

Bergman et al.

[11] 3,742,321
[45] June 26, 1973

[54] METHOD AND APPARATUS FOR STABILIZING MULTIPLE MOTOR DRIVEN SYSTEMS

[75] Inventors: Kjell Bergman; Arne Dybvig; Per Kain; Frede Sörensen, all of Vasteras, Sweden

[73] Assignee: Allmanna Svenska Elektriska Aktiebolaget, Vasteras, Sweden

[22] Filed: May 7, 1971

[21] Appl. No.: 141,176

[30] Foreign Application Priority Data

July 8, 1970  Switzerland .................... 9484/70

[52] U.S. Cl. ................................ 318/99, 318/72
[51] Int. Cl. ................................ H02p 5/46
[58] Field of Search ............ 318/70, 71, 72, 52, 318/85, 98, 99, 100

[56] References Cited
UNITED STATES PATENTS 3,263,142  7/1966  Adoutte et al. .................. 318/99
2,515,987  7/1950  Cook ............................... 318/99 X
2,523,120  9/1950  Kenyon ............................ 318/99 X
3,353,384  11/1967 Kain et al. ....................... 318/99 X
3,511,411  5/1970  Weiss .............................. 318/72 X
2,930,958  3/1960  Schaufuss ........................ 318/70
2,799,817  7/1957  Matthes et al. .................. 318/72 X Primary Examiner—T. E. Lynch
Attorney—Jennings Bailey, Jr.

[57] ABSTRACT

For stabilizing the operation of the motors in a system having a machine such as a rotary kiln driven by two motors, and where speed fluctuations of different frequencies may occur in the system, the motors are controlled through a single control member when the fluctuations are below a certain frequency whereas for fluctuation above that frequency a high pass filter permits the control signals to pass individually to the two motors.

4 Claims, 1 Drawing Figure

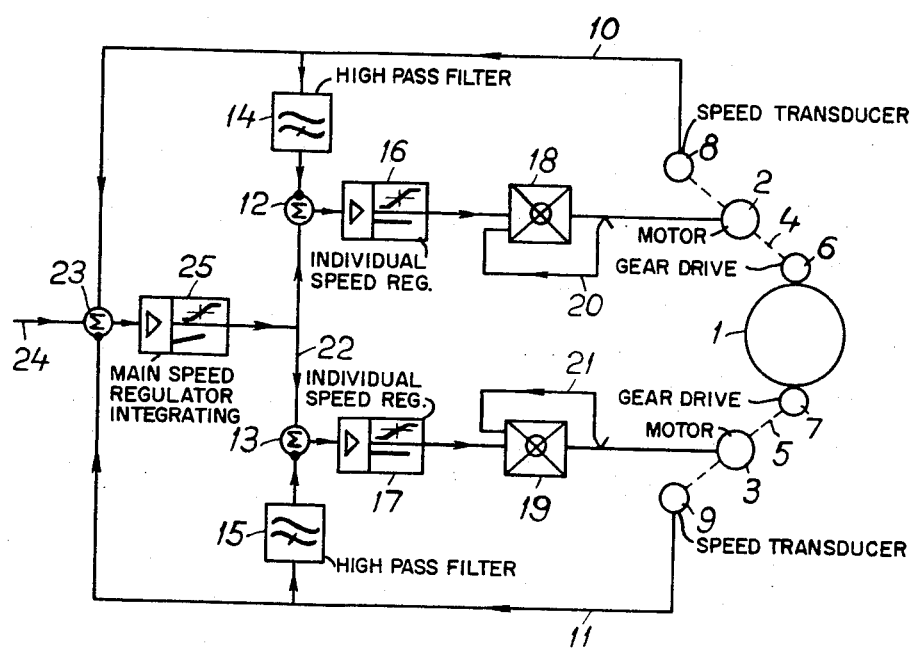

METHOD AND APPARATUS FOR STABILIZING MULTIPLE MOTOR DRIVEN SYSTEMS

BACKGROUND OF THE INVENTION

1. Field of the Invention

The invention relates to a method and apparatus for stabilizing the operation of motors in a system having an operating machine driven by at least two driving motors.

2. The Prior Art

With certain types of motor-driven operating machines, such as cement kilns, mills and the like, disturbances in the load may cause oscillation with frequencies corresponding to the natural frequencies of the system.

When two or more driving motors are used, a control system is required to give a uniform load distribution between the driving motors. If, thus, a common signal dependent on the speed is fed back to the regulating system, certain stationary natural oscillating phenomena may occur in the operating machine and driving motors if the oscillations are not sufficiently dampened.

SUMMARY OF THE INVENTION

The present invention relates to a method and means for stabilizing the motor operation in a system having an operating machine driven by two or more driving motors and where speed fluctuations having different frequencies may occur in the system.

Since an individual speed regulation of the driving motors has been introduced and this is only operative for the high frequency oscillatory phenomena which are caused by the natural oscillations of the system itself, rapid stabilization of operation is obtained when these phenomena occur. On the other hand, the mutual load distribution is unaffected when slow load variations occur.

BRIEF DESCRIPTION OF THE DRAWINGS

The accompanying drawing shows a diagram of the control system.

DESCRIPTION OF THE PREFERRED EMBODIMENTS

The drawing shows an operating machine 1 which may, for example, be a rotating cement kiln. This is driven by two motors 2 and 3, DC or asynchronous motors, with the help of shafts 4 and 5 and toothed gears 6 and 7. Each driving motor has a speed transducer 8 and 9, respectively, suitably a tachometer-generator, which emits a control signal corresponding to the speed of the driving motor to conductors 10 and 11, respectively. Summation devices 12 and 13, respectively, are connected to these two conductors over high pass filters 14 and 15, respectively. Each driving motor 2,3, is supplied with an individual speed regulator 16,17, respectively, and a current regulator 18,19, respectively, both of which are connected between the summation device and the motor. The summation devices 12 and 13 are fed by a common control signal by means of a conductor 22.

The two conductors 10 and 11 are also connected to a third summation device 23 which, over a conductor 24, is supplied with an adjustable reference value for the speed of the driving motors. This third summation device is connected over a main speed regulator 25 to the conductor 22. In this way the individual speed regulators 18 and 19 obtain their guiding value from the main speed regulator 25.

The two individual speed regulators 16 and 17 comprise a proportional amplifier suitably provided with amplitude limiters. The main speed regulator 25 suitably has an integrating amplifier with amplitude limiters.

The device according to the invention operates as follows:

The speed transducers 8 and 9 control the speed of their corresponding driving motors 2 and 3, respectively, and send out on the conductors 10 and 11 signals which correspond to the speeds and speed variations of the motors. Upon a rapid disturbance, the signal will be of high frequency and it may pass the corresponding high pass filter 14 or 15, whereafter it is fed to the corresponding individual speed regulator, whereby said rapid disturbances will be reduced. In this way individual disturbances of each of the driving motors are reduced or nullified.

If the operating machine itself, that is, the object which is driven by both the motors 2 and 3, is exposed to disturbances, the signals generated by the transducers 8 and 9 have a very low frequency because of the great weight of the machine. Such low frequency signals cannot pass the filters 14 and 15, but are fed to the summation device 23 and the main speed regulator 25 and also to both of the individual regulators 16 and 17, whereby the two driving motors are regulated simultaneously and in exactly the same way.

Short rapid disturbances generating high frequent signals are thus corrected by the aid of only one individual speed regulator, while slow disturbances derived from the driven machine will be corrected by the aid of the main speed regulator and the two individual speed regulators.

We claim:

1. Method of stabilizing the motor operation in a system having an operating machine driven by at least two driving motors and where speed fluctuations having different frequencies may occur in the system, which comprises regulating the speed of the motors jointly for fluctuations within one certain frequency range and individually within another frequency range.

2. Method according to claim 1, in which the driving motors are regulated individually upon fluctuations with high frequencies and jointly within a lower frequency range.

3. Method according to claim 2 in which the motors are provided with speed regulators, which comprises forming a control signal proportional to the speed of each driving motor, and filtering the signals to supply signals within the high frequency range only directly to the speed regulators for each driving motor.

4. Apparatus for carrying out the invention of claim 1, comprising, in combination with at least two driving motors, a speed transducer connected to each driving motor, a main speed regulator connected to both driving motors for controlling the speed thereof, an individual speed regulator for each motor, means connecting the speed transducer to the main speed regulator and the individual speed regulators, the means connecting the speed transducer to the individual speed regulators including high pass filters between each speed transducer and the corresponding individual speed regulator.

* * * * *